(12) United States Patent
Chartier et al.

(10) Patent No.: US 7,239,781 B2
(45) Date of Patent: Jul. 3, 2007

(54) COMPOSITE FIBER RADIAL COMPRESSION MEMBERS IN AN UMBILICAL

(75) Inventors: Andre Chartier, Panama City Beach, FL (US); Paul Gahm, Houston, TX (US)

(73) Assignee: Oceaneering International, Inc., Houston, TX (US)

(*) Notice: Subject to any disclaimer, the term of this patent is extended or adjusted under 35 U.S.C. 154(b) by 0 days.

(21) Appl. No.: 11/269,327

(22) Filed: Nov. 8, 2005

(65) Prior Publication Data

US 2006/0141252 A1 Jun. 29, 2006

Related U.S. Application Data

(60) Provisional application No. 60/625,858, filed on Nov. 8, 2004.

(51) Int. Cl.
*G02B 6/44* (2006.01)
*H01B 7/00* (2006.01)
(52) U.S. Cl. ............... 385/103; 385/100; 385/101; 385/106; 385/107; 385/112; 385/113; 174/24; 174/25 R; 174/70 R; 174/96; 174/99 R

(58) Field of Classification Search ............ 385/100, 385/101, 102, 103, 105, 106, 107, 109, 110, 385/112, 113; 174/24, 24 R, 25 C, 28, 394, 174/70 R, 47, 96, 99 R, 25 R
See application file for complete search history.

(56) References Cited

U.S. PATENT DOCUMENTS

| | | | |
|---|---|---|---|
| 4,196,307 A * | 4/1980 | Moore et al. ............... 174/47 |
| 4,462,717 A | 7/1984 | Falcimaigne ............... 405/195 |
| 4,726,314 A * | 2/1988 | Ayers ............... 114/243 |
| 5,902,958 A * | 5/1999 | Haxton ............... 174/47 |
| 6,538,198 B1 | 3/2003 | Wooters ............... 174/47 |
| 6,556,780 B2 | 4/2003 | Mjelstad et al. ............... 392/469 |
| 6,612,370 B1 | 9/2003 | Jahnsen et al. ............... 166/367 |
| 6,662,742 B2 | 12/2003 | Shelton et al. ............... 114/312 |
| 6,706,348 B2 | 3/2004 | Quigley et al. ............... 428/36.3 |
| 6,763,889 B2 | 7/2004 | Rytlewski et al. ............... 166/338 |
| 2006/0141252 A1 * | 6/2006 | Chartier et al. ............... 428/375 |

FOREIGN PATENT DOCUMENTS

GB 2396125 6/2004 ............ 385/101 X
WO WO 2004/071702 A1 8/2004 ............ 385/101 X

* cited by examiner

*Primary Examiner*—Brian M. Healy
(74) *Attorney, Agent, or Firm*—Duane Morris LLP

(57) ABSTRACT

The present inventions relate generally to umbilicals comprising at least one inner tube and at least one composite fiber element to provide greater resistance to radial compressive forces. Such umbilicals may be used in subsea hydrocarbon production applications.

20 Claims, 1 Drawing Sheet

COMPOSITE FIBER RADIAL COMPRESSION MEMBERS IN AN UMBILICAL

PRIORITY INFORMATION

This application claims the benefit of U.S. Provisional Application No. 60/625,858, filed on Nov. 8, 2004.

FIELD OF INVENTION

The present inventions relate generally to umbilicals comprising at least one inner tube and at least one composite fiber element to provide greater resistance to radial compressive forces. Such umbilicals may be used in subsea hydrocarbon production applications.

BACKGROUND OF THE INVENTION

Umbilical cables are used to supply power and/or control signals from a topside structure such as a platform to equipment located subsea, such as a remotely operated vehicle "ROV". Due to increased operating/installation depths of umbilical systems, umbilicals are typically subjected to increasingly higher levels of radial compression forces, e.g. by installation equipment during the actual installation process. The present inveniton relates to the use of composite fiber beam elements and/or composite taping layers and/or composite fibers which may be incorporated directly into umbilicals when those umbilicals are being manufactured, e.g. during an extrusion process. In this manner, compressive forces may be distributed throughout the umbilical structure.

DETAILED DESCRIPTION OF PREFERRED EMBODIMENTS

Figure 1:
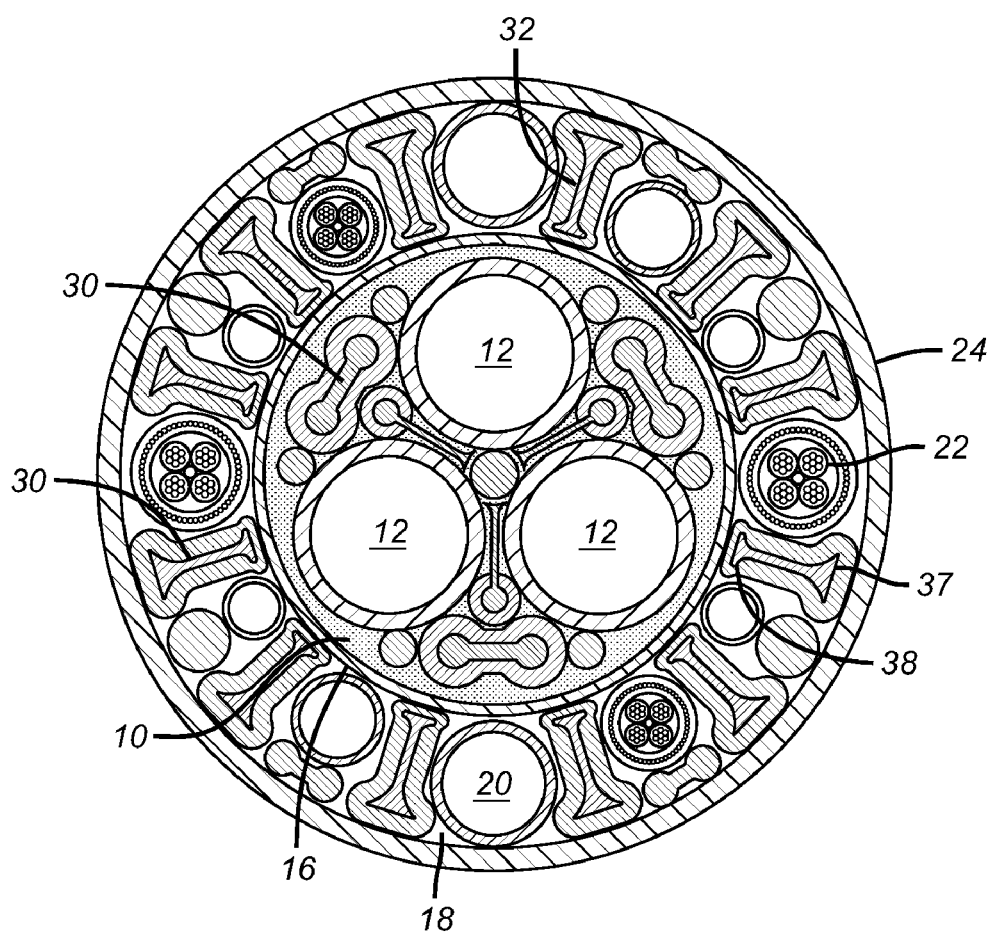
FIG. 1 is a cross sectional view of a preferred embodiment of the present invention.

FIG. 1 illustrates a cross-section of a preferred embodiment of an umbilical according to the present inventions. A preferred embodiment of the present invention comprises an inner section 10 comprising at least two inner tubes 12. In one preferred embodiment, the inner section comprises at least three inner tubes arranged in a triangular configuration wherein a composite fiber element is positioned between each pair of adjacent inner tubes, as illustrated in FIG. 1. In another preferred embodiment, the inner section has a circular cross sectional area, as shown in FIG. 1. This embodiment further comprises a composite fiber element 30 positioned between the two inner tubes and a composite tape 16 surrounding the inner section. In the preferred embodiment shown in FIG. 1, the inner tubes 12 are positioned beside each other.

A preferred embodiment of the invention further comprises an outer annular section 18 surrounding the composite tape and comprising at least one outer tube 20 and one transmission cable 22. In one preferred embodiment, the transmission cable is electrically conductive. In another preferred embodiment, the transmission cable is a fiber optic cable.

This embodiment of the invention further comprises a composite fiber element 30 positioned between the outer tube and the transmission cable, and an outer wall 24 surrounding the outer annular section. In another preferred embodiment, the inner section is concentrically located, relative to the outer annular section, as shown in FIG. 1. In another preferred embodiment, the outer wall has a circular cross section.

In a preferred embodiment, each composite fiber element has a cross sectional area comprising a central elongated region 32 comprising a first end 34, and a second end 36. In this preferred embodiment, the composite fiber element further comprises a first flared region 37 connected to the first end, and a second flared region 38, connected to the second end, as shown in FIG. 1. In another preferred embodiment, each flared region is circular. In yet another preferred embodiment, at least one composite fiber element comprises a region having a substantially circular cross section, as shown in FIG. 1.

In one preferred embodiment, the outer annular section comprises at least two outer tubes located on substantially opposing sides of the inner section, at least two transmission cables, each of which are located between two outer tubes, and a composite fiber element located between each adjacent pair of outer tubes and transmission cables, as shown in FIG. 1.

Using composite fiber beam elements and/or composite taping layers and/or composite fibers which may be incorporated directly into umbilicals, a more robust umbilical design may be realized, allowing installation and use of umbilicals in deeper water without requiring upgrading of installation equipment. In addition to radial support, an umbilical of the present inventions may also be used as an axial tension member, e.g. by terminating them in umbilical strength terminations in such a way was to share axial loads with one or more existing tension members. In this embodiment, the umbilical comprises a first end region comprises a termination having equivalent strength to that of the remainder of the umbilical. Such a termination is illustrated in FIG. 1. Such tension members are typically steel tube components and/or steel armor layers. In another embodiment, the first end of the umbilical is connected to an axial tension member with which the first end of the umbilical shares an axial load.

The foregoing disclosure and description of the inventions are illustrative and explanatory. Various changes in the size, shape, and materials, as well as in the details of the illustrative construction and/or a illustrative method may be made without departing from the spirit of the invention.

What is claimed is:

1. An umbilical comprising:
   (a) an inner section comprising at least two inner tubes positioned beside each other;
   (b) a first composite fiber element positioned between the two inner tubes;
   (c) a composite tape surrounding the inner section;
   (d) an outer annular section surrounding the composite tape and comprising at least one outer tube and one transmission cable;
   (e) a second composite fiber element positioned between the outer tube and the transmission cable; and
   (f) an outer wall surrounding the outer annular section.

2. The umbilical of claim 1, wherein the transmission cable is electrically conductive.

3. The umbilical of claim 1, wherein the transmission cable is a fiber optic cable.

4. The umbilical of claim 1, wherein the inner section comprises at least three inner tubes arranged in a triangular configuration and a composite fiber element is positioned between each pair of adjacent inner tubes.

5. The umbilical of claim 1, wherein the inner section is concentrically located relative to the outer annular section.

6. The umbilical of claim 1, wherein each composite fiber element has a cross sectional area comprising:
   (a) a central elongated region comprising a first end and a second end 36;
   (b) a first flared region connected to the first end; and
   (c) a second flared region connected to the second end.

7. The umbilical of claim 6, wherein each flared region is circular.

8. The umbilical of claim 1, wherein the outer annular section comprises:
   (a) at least two outer tubes located on substantially opposing sides of the inner section;
   (b) at least two transmission cables, each of said transmission cables located between two outer tubes; and
   (c) a composite fiber element located between each adjacent pair of outer tubes and transmission cables.

9. The umbilical of claim 1, wherein at least one composite fiber element comprises a region having a substantially circular cross section.

10. The umbilical of claim 1, wherein the umbilical comprises a first end region comprising a termination having equivalent strength to that of the remainder of the umbilical.

11. The umbilical of claim 10, further comprising an axial tension member to which said first end is connected and with which it shares an axial load.

12. An umbilical comprising:
   (a) an inner section comprising at least one inner tube;
   (b) a first composite fiber element in the inner section comprising a central elongated region comprising a first end and a second end;
   (c) a composite tape surrounding the inner section;
   (d) an outer annular section surrounding the composite tape and comprising at least one outer tube;
   (e) a second composite fiber element in the outer annular section comprising a central elongated region comprising a first end and a second end; and
   (f) an outer wall surrounding the outer annular section.

13. The umbilical of claim 12, further comprising a transmission cable in the outer annular section.

14. The umbilical of claim 12, wherein each composite fiber element has a cross sectional area comprising:
   (a) a first flared region connected to the first end; and
   (b) a second flared region connected to the second end.

15. The umbilical of claim 12, wherein at least one composite fiber element comprises a region having a substantially circular cross section.

16. An umbilical comprising:
   (a) an inner section comprising at least two inner tubes positioned beside each other and a composite fiber element located between the two tubes; and
   (b) an outer wall surrounding the inner section.

17. The umbilical of claim 16, wherein the composite fiber element has a cross sectional area comprising:
   (a) a central elongated region comprising a first end and a second end;
   (b) a first flared region connected to the first end; and
   (c) a second flared region connected to the second end.

18. The umbilical of claim 17, wherein each flared region is circular.

19. The umbilical of claim 16, wherein the inner section comprises at least three inner tubes arranged in a triangular configuration and a composite fiber element is positioned between each pair of adjacent inner tubes.

20. The umbilical of claim 19, wherein at least one composite fiber element comprises a region having a substantially circular cross section.

* * * * *